United States Patent
Williams

(10) Patent No.: US 7,076,767 B1
(45) Date of Patent: Jul. 11, 2006

(54) METHOD FOR CONTROLLING AND COLLECTING INFORMATION IN A DATA PROCESSING SYSTEM

(75) Inventor: David P. Williams, Mounds View, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/475,563

(22) Filed: Dec. 30, 1999

(51) Int. Cl.
*G06F 9/44* (2006.01)

(52) U.S. Cl. ........................ 717/127; 717/131
(58) Field of Classification Search ......... 717/124–135
See application file for complete search history.

(56) References Cited

U.S. PATENT DOCUMENTS

| | | | | |
|---|---|---|---|---|
| 5,355,479 | A * | 10/1994 | Torii et al. .................. 717/107 |
| 5,809,540 | A * | 9/1998 | Malek et al. ................ 711/154 |
| 5,835,770 | A * | 11/1998 | Shum et al. ................ 717/127 |
| 5,838,897 | A * | 11/1998 | Bluhm et al. .......... 395/183.06 |
| 5,897,635 | A * | 4/1999 | Torres et al. ................. 707/10 |
| 5,978,902 | A * | 11/1999 | Mann ........................ 712/227 |
| 6,094,729 | A * | 7/2000 | Mann ........................... 714/25 |
| 6,145,123 | A * | 11/2000 | Torrey et al. ................... 717/4 |
| 6,327,700 | B1 * | 12/2001 | Chen et al. .................. 717/127 |
| 6,438,512 | B1 * | 8/2002 | Miller ......................... 702/186 |
| 6,467,052 | B1 * | 10/2002 | Kaler et al. .................. 714/39 |
| 6,530,076 | B1 * | 3/2003 | Ryan et al. .................. 717/128 |
| 6,728,949 | B1 * | 4/2004 | Bryant et al. ............... 717/127 |

* cited by examiner

*Primary Examiner*—Kakali Chaki
*Assistant Examiner*—William H. Wood
(74) *Attorney, Agent, or Firm*—Charles A. Johnson; Mark T. Starr; Crawford Maunu PLLC

(57) ABSTRACT

A system and method for selectively collecting information within logical modules of the computing system, where the content collected and the collection periods are dynamically controllable to accurately target the most relevant information. One of a plurality of information storage modes is dynamically selected, where each of the information storage modes identifies a different set of information from the plurality of logical segments that is to be stored. At least one of a plurality of data collection periods is dynamically selected, where the data collection periods define temporal windows in which storage of the designated set of information is enabled. The designated set of information identified by the designated information storage mode is stored only during the designated data collection period.

43 Claims, 8 Drawing Sheets

| WRITE MODE | REGISTER BITS | | |
|---|---|---|---|
| NORMAL | 1 | X | X |
| CYCLE | 0 | 1 | 1 |
| FUNCTION/ADDRESS | 0 | 0 | 0 |
| DUPLICATE TAG | 0 | 0 | 1 |
| NORMAL OR DUPLICATE TAG | 0 | 1 | 0 |

FIG. 5

| START FEATURE | REGISTER BITS | |
|---|---|---|
| ALWAYS ON | 0 | 0 |
| START ON F/A COMPARE | 0 | 1 |
| START ON IP SIGNAL | 1 | 0 |
| UNDEFINED | 1 | 1 |

FIG. 6

| STOP FEATURE | REGISTER BITS | | |
|---|---|---|---|
| NO STOP | 0 | 0 | 0 |
| STOP ON F/A COMPARE | 0 | 0 | 1 |
| STOP ON IP SIGNAL | 0 | 1 | 0 |
| STOP BEFORE OVERWRITE | 0 | 1 | 1 |
| STOP ON EP DETECTED CRITICAL ERROR | 1 | 0 | 0 |
| STOP ON EP DETECTED PASSIVE ERROR | 1 | 0 | 1 |
| STOP ON NO REQUEST FROM IP | 1 | 1 | 0 |
| STOP ON NO REQUEST FROM BUS | 1 | 1 | 1 |

FIG. 7

METHOD FOR CONTROLLING AND COLLECTING INFORMATION IN A DATA PROCESSING SYSTEM

FIELD OF THE INVENTION

This invention relates generally to testing and servicing of computing systems, and more particularly to a system and method for selectively collecting information within logical modules of the computing system, where the content collected and the collection periods are controllable to accurately target the most relevant information.

BACKGROUND OF THE INVENTION

The evolution of computer architectures ranging from the vacuum tube technology and binary machine language programming of yesteryear to today's complex and high-speed computers all share at least one goal, which is to achieve high performance and reliability. In the earliest days of computing, designs were typically tested by manually probing access points in the system, which facilitated design verification and error discovery. The advent of semiconductor chips introduced smaller, more efficient systems, but testing still typically involved manual detection of problems. As software became more effective and popular, software compiling and debugging tools allowed computer programs to be more easily tested, yet hardware was still tested by analyzing signals at hardware access points. Test systems often included the use of dedicated connectors on printed circuit boards (PCBs), "bed-of-nails" test facilities, and the like. These systems, while useful in their day, are of diminishing value in the modern computer era, where in some cases computers can reside on a single chip. Even large-scale computers, while increasing in computational power, have been greatly reduced in size through the use of programmable logic devices, application-specific integrated circuits (ASICs), etc. Thus, while aggregating computational power into a small number of chips is highly beneficial to increase computer performance and marketability, it has made collecting information for purposes of testing, debugging and servicing increasingly challenging.

As integrated circuits continue to operate at faster speeds and have greater cell densities, it becomes more difficult to detect errors and capture information that assists in locating and identifying the errors. For example, as ASICs continue to become more densely populated, an increasing amount of the ASIC circuitry is embedded and unavailable for direct monitoring. Information from within the ASIC must somehow be captured and provided externally for analysis.

The information collected may be used for debugging problems found during the simulation and hardware checkout phases. Initial errors occurring during the design phase can be corrected with the help of an effective debugging mechanism. The information may also be used for analyzing problems reported from customer sites, as it is imperative that error discovery and analysis be provided in order to service customers without having to replace an entire system. The performance of the particular computer system under analysis can also be gauged by collecting and monitoring information generated by an operational computer system.

Prior data capturing methods lack flexibility of use, and are difficult to use in debugging hardware information and in servicing computer hardware. These existing systems have limited resources in collecting data. For example, prior art data capturing methods may have a predefined amount of information that is periodically gathered and dumped for analysis. However, as system complexity increases, and more information is embedded and thus unavailable for direct analysis, the information collected may be of limited value, or may require massive amounts of memory to store the predefined amount of information, or may require extensive dissection of the information once collected. Such a system is inflexible and cumbersome, and does not selectively target the desired information.

Accordingly, there is a need for an effective debugging mechanism and methodology that will capture and record a large volume of information, while providing the flexibility to control when, and which, of the total set of information is to be collected at a given time. It would also be beneficial for such a mechanism and methodology to allow control of the data capture to facilitate analyzation of the contents of specific registers in the system when necessary. Further, it would provide great benefit to allow targeted information to be captured during normal system operation, where controllability of the selection of information and time of capture is controllable during normal operation of the system clocks. The present invention provides such a system, and provides a flexible, accurate information collection system and method for debugging and servicing computer systems. The present invention therefore provides a solution to the aforementioned and other shortcomings of the prior art, and offers additional benefits and advantages over the prior art.

SUMMARY OF THE INVENTION

The present invention relates to a system and method for selectively collecting information within logical modules of the computing system, where the content collected and the collection periods are dynamically controllable to accurately target the most relevant information.

In accordance with one embodiment of the invention, a method is provided for selectively collecting information from a plurality of logical segments in a computing environment. A plurality of information storage modes are provided, and one of the information storage modes is designated. Each of the information storage modes identifies a different set of information from the plurality of logical segments that is to be stored. At least one of a plurality of data collection periods is controllably designated, where the data collection periods define temporal windows in which storage of the designated set of information is enabled. The designated set of information identified by the designated information storage mode is stored, and is stored only during the designated data collection period.

Another aspect of the invention includes a system for selectively collecting information in a computing environment having a plurality of functional modules. Each functional module is associated with time-varying operational information as it operates. This operational information may be analyzed to identify operational defects in the computing environment. The system includes a memory for storing the operational information associated with the functional modules. A dynamically-configurable write mode selection module is provided, which is coupled to a control interface to receive one of a plurality of selectable write mode identifiers, and enables selected subsets of the operational information to be stored in the memory in response to the received write mode identifier. A dynamically-configurable timing control module receives one of a plurality of collection initiation identifiers and one of a plurality of collection termination identifiers. The timing control module enables the selected subset of operational information to be stored into the memory upon activation of an initiation event corresponding to the received collection initiation identifier, and terminates storing of the selected subset of operational information into the memory upon activation of a termination event corresponding to the received collection termination identifier.

In another embodiment of the invention, information is selectively collected from a plurality of functional modules in a computing environment. One of a plurality of information storage modes is selected, where each of the information storage modes identifies a different set of information from the functional modules that is to be stored. One of a plurality of storage commencement events is also selected, where each of the storage commencement events identifies a different triggering event that allows storage of the designated set of information to begin. Similarly, one of a plurality of storage termination events is selected, where each of the storage termination events identifies a different triggering event to discontinue storage of the designated set of information. The system is monitored for activation of the designated storage commencement event, and upon recognition of the commencement event, the designated set of information begins to be stored in accordance with the designated information storage mode. Activation of the designated storage termination event is also monitored, and storing of the designated set of information is disabled upon recognition of the storage termination event.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

FIG. 5 is a table illustrating one embodiment of the invention having five write modes of operation;

FIG. 6 is a table illustrating one embodiment of the invention having three defined start events;

FIG. 7 is a table illustrating one embodiment of the invention having eight stop events;

DETAILED DESCRIPTION OF THE ILLUSTRATED EMBODIMENTS

Generally, the present invention provides a system and method for selectively collecting information within logical modules of a computing system. Multiple groups of information content are determined in advance, and the particular information content to be analyzed can be selected. A flexible data collection mechanism is provided, whereby numerous collection commencement events and termination events are defined to allow great flexibility in when and which information is to be collected. The invention allows the most relevant information relating to a situation or circumstance to be targeted, rather than simply gathering volumes of information, which results in lengthy analyzation and inherent inefficiencies.

While the present invention is particularly advantageous in the context of a multi-processing data processing environment as described below, it will be appreciated by those skilled in the art that the invention is equally applicable to other computing environments subject to design verification or field failure analysis. For example, the present invention is particularly useful for verifying and testing embedded logic in application-specific integrated circuits (ASICs) and other embedded logic not easily pin-accessible. Therefore, many aspects of the particular multiprocessing computer environment described in the following figures is provided for illustrative purposes and to provide an operational understanding of the invention; however the invention is not limited thereto.

Figure 1:
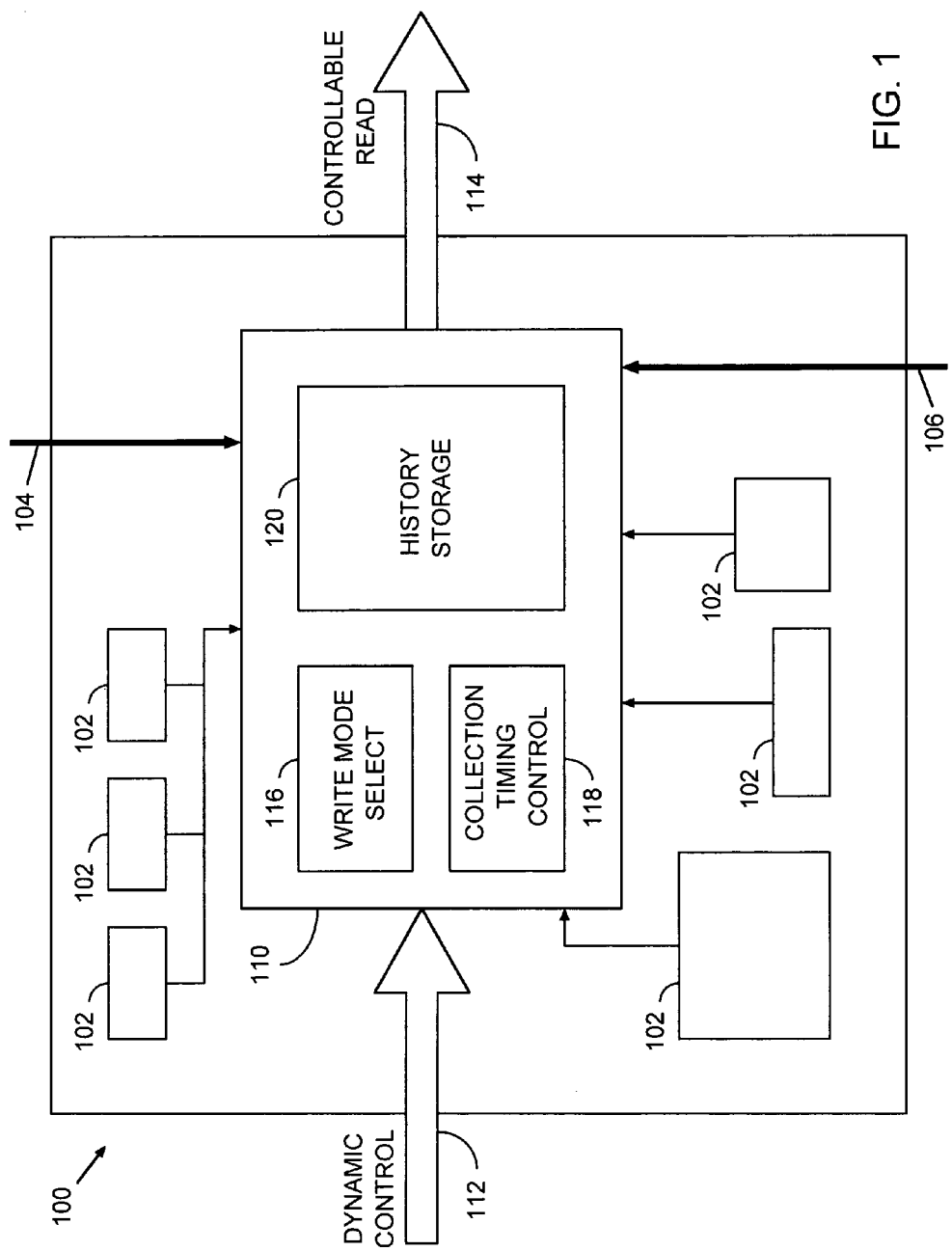
FIG. 1 is a block diagram illustrating an example computing environment in which the principles of the present invention may be applied.

FIG. 1 is a block diagram illustrating an example computing environment in which the principles of the present invention may be applied. In FIG. 1, the example computing environment is illustrated in the form of a logic chip 100, such as an application-specific integrated circuit (ASIC). ASICs and other high-density logic devices typically include a large amount of embedded circuitry that is not accessible at pins of the chip package. This means that certain logic within such a device is difficult to test, and often presents even greater complexities in locating points of failure or other operational problems.

The example ASIC 100 in FIG. 1 includes various logic sections within the ASIC. If an operational problem arises, it is beneficial to determine the state of one or more of these on-chip logic sections to assist in locating the source of the problem or defect. For purposes of illustration, these logic sections are generally represented by blocks 102. Such an ASIC may also be coupled to other logic or hardware within a computing environment, and these associations are generally depicted by interface lines 104 and 106. For example, interface 104 may represent a bus which connects two or more ASICs or other logic in a computing system. While not depicted in FIG. 1, these interfaces 104 and 106 may be coupled to logic within the ASIC 100, such as bus interface logic or other interface circuitry.

FIG. 1 generally illustrates one manner in which the principles of the present invention may be applied to such a logic design 100. In this embodiment of the invention, the ASIC 100 includes history stack logic 110 that selectively collects desired information from within, or external to, the ASIC 100. The history stack logic 110 is dynamically controllable via interface 112, thus allowing dynamic control of operational modes, information collection start and stop periods, and other selectable items to provide a highly effective manner of collecting the appropriate information at the appropriate time. The information that is selectively gathered is collected via a controllable read interface 114 when desired.

The history stack logic 110 in the embodiment of FIG. 1 includes at least a write mode select module 116, a collection timing control module 118, and a history storage 120. Generally, the write mode select 116 allows for multiple information write modes of operation. The particular write mode selected corresponds to certain predetermined parameters, such as from which logic section(s) 102 information will be gathered and stored, under what conditions will the information be gathered, and the like.

The collection timing control 118 is a highly beneficial segment, allowing information collection to begin and end on a wide variety of dynamically controllable events. This becomes increasingly important as the size and computing power of the host computing system increases. This is due to the incredible processing power and speed of contemporary computing systems, particularly large-scale computing systems in which the present invention is particularly useful. Because of the great speed in which computing systems can operate, it would be impractical to attempt to continuously gather operational information during design test or under normal operating conditions. More particularly, the speed and processing power of such computing systems would require massive storage capabilities to record the state of each logic section in a system. It would not be practical to continuously record and accumulate such historical information merely to help identify the source of a problem that may never even arise. Therefore, the amount of memory or other storage reserved to track such historical information should be kept as small as reasonably possible. The collection timing control circuitry 118 facilitates such an objective, by allowing dynamic control of multiple events that will start and stop the collection process at the appropriate times. In this manner, desired failure analysis data can be pinpointed and stored in the relatively small history storage 120, and upon detection of a problem requiring analysis of historical data, the history storage 120 will contain the information relevant to analyzing the problem.

Figure 2:
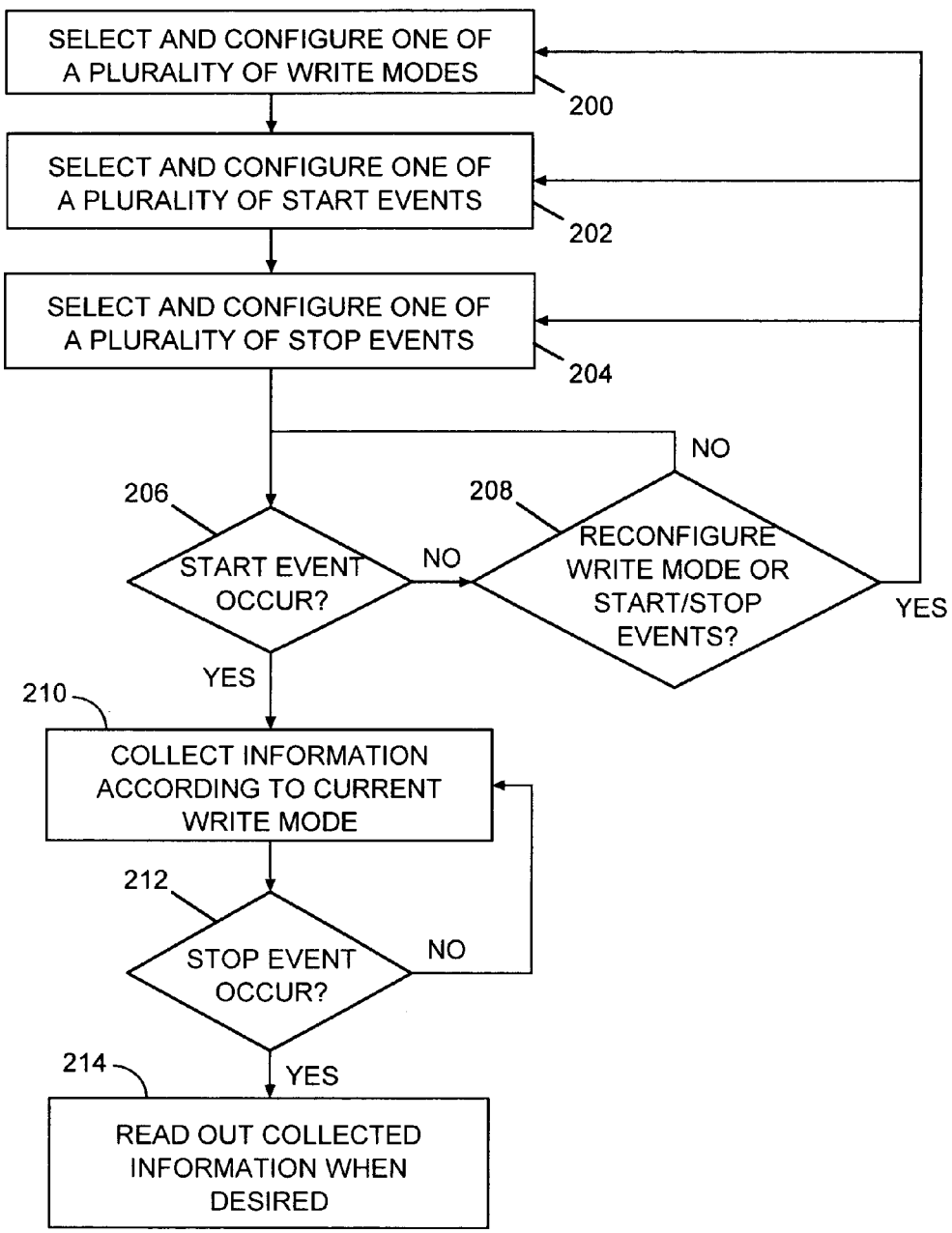
FIG. 2 is a flow diagram illustrating one manner in which the principles of the present invention may be applied in a computing environment.

FIG. 2 is a flow diagram illustrating one manner in which the principles of the present invention may be applied in a computing environment. In this embodiment, a plurality of write modes are predefined, and one of the plurality of write modes is selected and appropriately configured as shown at block 200. Selection and configuration of a write mode facilitates writing of the desired information to the history storage (e.g., history storage 120 of FIG. 1). For example, depending on the particular problem targeted, or depending on the particular logic sections of interest, the write mode can be dynamically changed to accommodate such desires. A plurality of "start events" are also predefined, selected and appropriately configured as shown at block 202, where the start events are dynamically configurable events causing the information identified by the selected write mode to begin being captured in the history storage. A plurality of "stop events" are also predefined, selected and appropriately configured as shown at block 204, where the stop events are dynamically configurable events causing the information identified by the selected write mode to stop being collected in the history storage.

Once configured, collection of information will not begin unless the configured start event occurs as detected at decision block 206. Where the start event has not occurred, the history data collection does not occur and will not occur until the start event is triggered. Alternatively, as shown in FIG. 2, the write mode, start events and stop events may be reconfigured if desired as shown at decision block 208. At any time, if such reconfiguration is desired, the write mode and start/stop events may be reconfigured as illustrated by the paths leading back to blocks 200, 202 and 204. Otherwise, where reconfiguration is not desired, the process merely waits for the start event to occur.

When the configured start event occurs, the information identified by the currently-selected write mode is collected 210. This information will be collected until the configured stop mode is detected. This is illustrated at decision block 212, and where the stop event has not occurred, the information will continue to be collected as shown at block 210. Once the stop event occurs, no further information will be stored in the history storage. The information stored in the history storage can thereafter be read from the history storage when desired, as illustrated at block 214.

Figure 3:
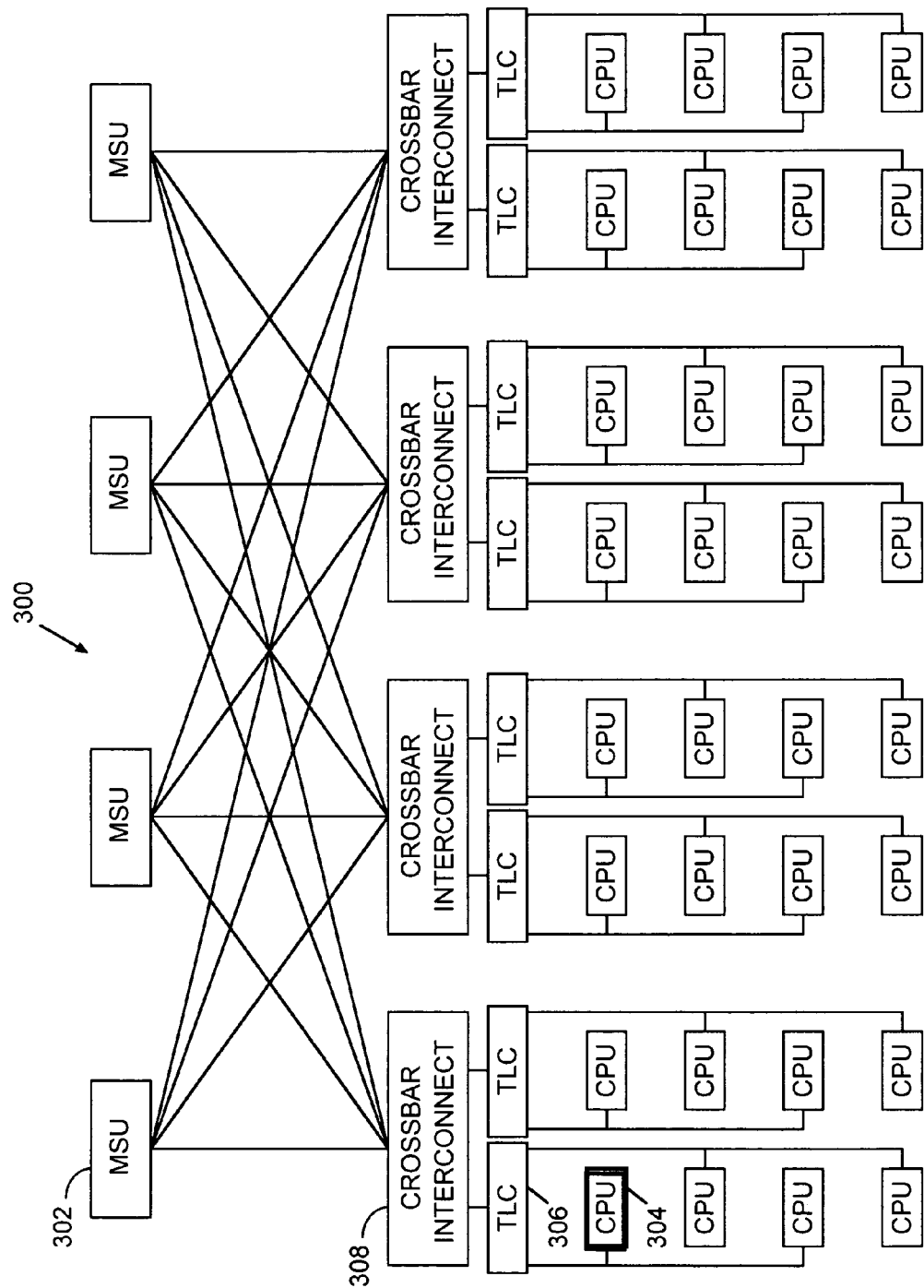
FIG. 3 illustrates an example system computing environment in which the principles of the present invention may be applied.

FIG. 3 illustrates an example computing environment 300 in which the principles of the present invention may be applied. The invention is particularly useful in such a system due to its size and complexity. A large-scale computing system may include multiple main storage units (MSU) 302. The MSU 302 may represent the main memory, such as random access memory, in a computing system. This memory may be accessible to multiple central processing units (CPU) such as CPU 304. Each CPU 304 may include its own first level cache (FLC) and second level cache (SLC), and multiple CPUs may in turn be coupled to a third level cache (TLC). For example, the CPU 304 is coupled to TLC 306. Each TLC 306 is coupled to a crossbar interconnect 308, which allows data to be transferred between any CPU 304 and any TLC 308 and MSU 302. In one embodiment, the history stack logic of the present invention resides within each CPU 304, and facilitates the gathering of information (e.g., address, function, data ownership, etc.) affecting that CPU 304 at a particular time.

Technological advances in semiconductor fabrication and general chip design now allow massive amounts of logic to be embedded into a single chip. In the example shown in FIG. 3, the CPU 304 contains an instruction processor and an associated storage controller all within a common ASIC. Because of present chip densities and the incredible amount of embedded circuitry in such a chip, the present invention is highly beneficial in discovering the source of embedded logic problems.

Figure 4:
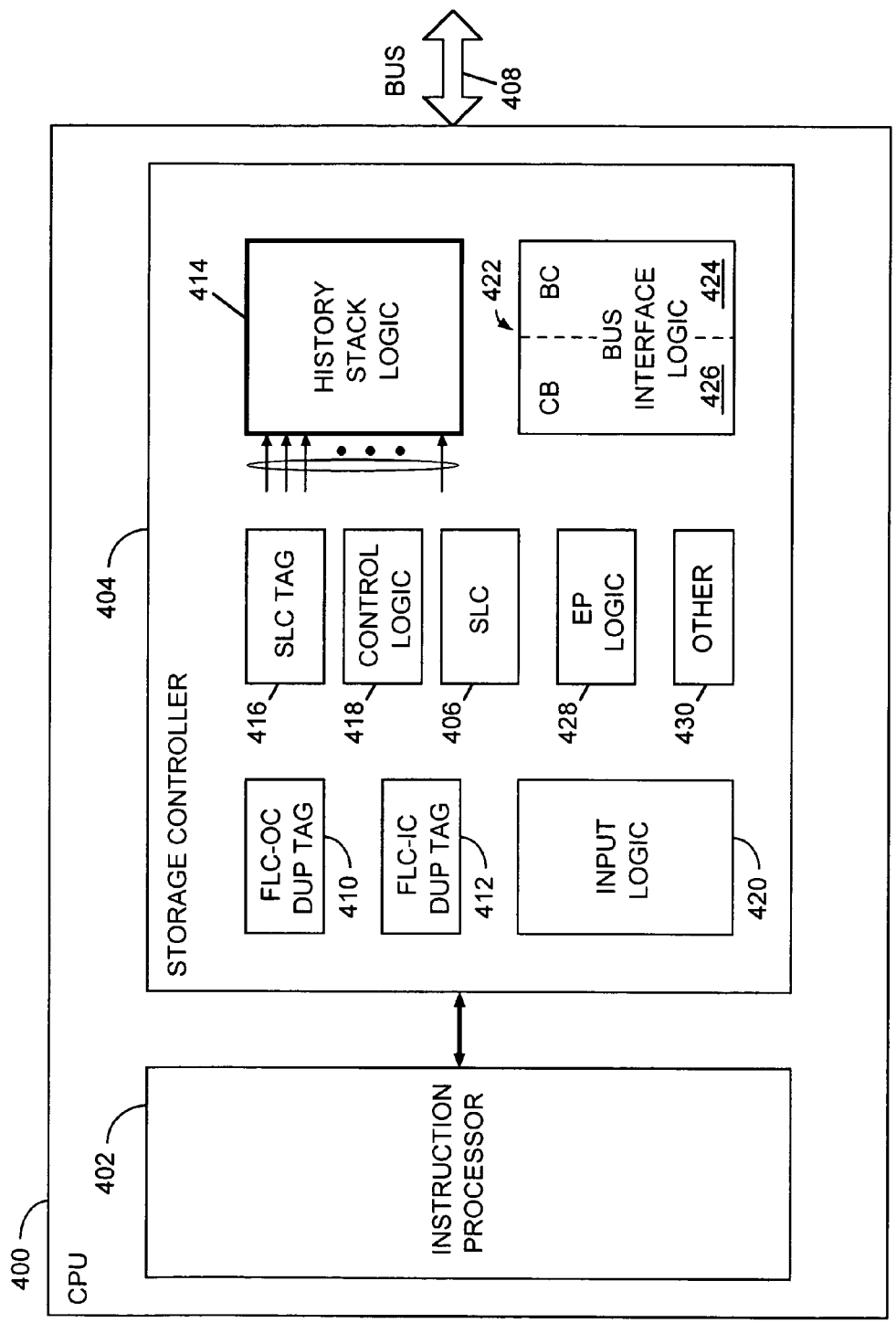
FIG. 4 is a block diagram of one embodiment of a central processing unit designed in a single chip package.

FIG. 4 is a block diagram of one embodiment of a CPU 400 designed in a single chip package. The CPU 400 may represent the CPU 304 of FIG. 3. While the particular logic functions within the CPU 400 may vary by design, a number of particular logic functions are illustrated in the CPU 400 for purposes of obtaining an understanding of the invention.

Within the example CPU 400 of FIG. 4 is an instruction processor (IP) 402 that provides the processing capabilities of the CPU 400. The IP 402 interfaces with the storage controller (SC) 404, which provides the second level cache (SLC) 406 and the associated control and interface logic. In one embodiment, the SLC 406 is an ownership-based cache that is dedicated to a single IP 402. The SC 404 interfaces with a bus 408, such as a P7 bus, that in turn interfaces to the TLC 306 shown in FIG. 3.

The SC 404 includes a variety of different logic sections, some of which are shown in FIG. 4. The instruction processor 402 of the present example includes a first level cache (FLC), and since the example computing environment is an ownership-based system, FLC duplication tag logic 410 and 412 are provided. In systems having multiple instruction processors with FLCs, and having multiple SLCs, TLCs and main storage units, cache coherency must be maintained.

Cache coherency protocols ensure that one processor's cached copy of a shared memory location is invalidated when another processor writes to that location, thereby guaranteeing that each processor is always operating on the latest copy of the data. Many known methods exist to maintain cache coherency. Some earlier systems achieve coherency by implementing memory locks. That is, if an updated copy of data existed within a local cache, other processors were prohibited from obtaining a copy of the data from main memory until the updated copy was returned to main memory, thereby releasing the lock. Other manners of maintaining cache coherency exist, such as memory bus "snooping", and other techniques. For distributed systems having hierarchical memory structures, directory-based coherency systems have been used. Directory-based coherency systems utilize a centralized directory to record the location and the status of data as it exists throughout the system, thereby determining "ownership" of the data. For example, the directory records which caches have a copy of the data, and further records if any of the caches have an updated copy of the data. When a cache makes a request to main memory for a data item, the central directory is consulted to determine where the most recent copy of that data item resides. Based on this information, the most recent copy of the data is retrieved so it may be provided to the requesting cache. The central directory is then updated to reflect the new status for that unit of memory. There may be various ownership condition in such a system. Cache coherency systems in general are known in the art, and need not be further discussed herein.

In the example of FIG. 4, FLC cache coherency is achieved by using invalidate logic and associated interfaces in the SC 404 to invalidate FLC cache locations in the IP 402 when cache write functions are performed. Since multiple IPs 402 in different CPUs may contain the same data block in one or both of its caches, all other copies of that data block must be located and invalidated when a requester performs a write. Each IP 402 contains two "tag" memories that record which blocks are currently resident in its caches. One tag memory is for the instruction cache and one is for the operand cache. Each SC 404 has a duplicate copy of its associated IP's tag memory which contains copies of the data blocks currently resident in their respective IP caches. The first level cache operand cache (FLC-OC) dup tag logic 410 is the tag memory for the FLC-OC, and the first level cache instruction cache (FLC-IC) dup tag logic 412 is the tag memory for the FLC-IC. Each write request that occurs in the system may generate an invalidate/snoop request to all the other duplicate tags in the system. Each duplicate tag will perform a search to determine if the data block is resident (i.e., a "hit"). If a hit occurs, that IP's tag must be invalidated. Where no hit occurs, no action is required. In order to analyze field problems, or to assist in testing/debugging, the state of the duplicate tag memories 410 and 412 may be of importance. Therefore, in one embodiment of the invention, information from the FLC-OC 410 and FLC-IC 412 duplicate tag memories may selectively be included among the data stored to the history stack logic 414. The second level cache (SLC) tag memory 416 performs an analogous function for the SLC 406, and thus may also be selectively included among the data stored to the history stack logic 414.

The control logic 418 controls the access to the SLC 406 based on the SLC tag 416. Generally, the control logic 418 determines whether a request is a hit or a miss in the SLC 406. If it's a hit, data can be written and read from the SLC 406 if the SLC 406 has ownership of the data—otherwise ownership is acquired and the function is then performed. Because the control logic 418 controls the SLC 406 operation within the SC 404, the state of the control logic may also be of importance in analyzing field problems and assisting in testing/debugging. Therefore, in one embodiment of the invention, signals from the control logic 418 are also selectively subject to being captured in the history stack logic 414 for analysis.

The input logic (IL) 420 captures data requests and prioritizes all requests that the SC 404 is going to act on. The requests include requests from the IP 402, and requests from other CPUs and caches received via the bus 408. The information available at the IL 420 therefore may include valuable information that can help determine what transaction was occurring at the time of a fault. For example, the data collected from such a request interface (i.e., IL 420) may include the function and address of the request, whether the particular SC 404 "owned" the data for cache coherency purposes, the requester identification, and any associated request information. Therefore, in one embodiment of the invention, information is selectively collected into the history stack logic 414 from the IL 420.

The bus interface logic 422 interfaces to the bus 408, which in one embodiment of the invention is a P7 bus known in the art. In one embodiment, the bus interface logic 422 is divided into two sections. A first section operates under the clock on the bus 408 which is a slower clock rate than the internal clock rate of the CPU 400. This first section is the BC (bus control 1) 424. A second section, the CB (bus control 2) 426 is generally an interface to the ASIC (i.e., CPU 400) that ultimately interfaces with the IL 420 via a data logic section (not shown) that transfers data back and forth between the CB 426 and the IL 420. Again, these interface sections may provide valuable information in the event of a failure, and therefore are selectively capable of having information collected by the history stack logic 414. For example, the CB data collected may include a variety of control, status and acknowledgment information that helps to determine the state of the system for debugging or other fault analyses.

The error and partitioning (EP) logic 428 represents an error collection module. Internal errors get routed to the EP 428 and are collected. Once collected, they may be scanned out via a dynamic string to report errors to maintenance logic. One embodiment of the present invention uses EP 428 events as a trigger for start and stop events. Thus, while the actual error information may be collected by the EP and scanned to maintenance logic different from the history stack logic 414, the EP 428 can serve as a trigger to begin gathering IL 420 information, CD 426 information, control logic 418 information, and so forth depending on the particular write mode selected. Alternatively, the EP 428 can serve as a trigger to stop gathering information upon the occurrence of such an error, to preserve existing information recently collected in the history stack logic 414. In this manner, the state of the system may be stored in the history stack logic 414 upon the occurrence of an internal error. The triggering errors may include critical or passive (non-critical) errors. A critical error is user-definable, and may include critical system events that threaten sustained operation of the system and may result in automatic or advised system shut down. A passive error is user-definable, and may include non-critical system events that do not immediately threaten sustained operation of the system, but nonetheless indicate that a failure or threatening situation may be imminent, non-critical or redundant components require attention, and the like. In one embodiment of the invention, a dedicated signal path is provided between the EP 428 and the history stack logic 414 to indicate the occurrence of any critical error, and a separate dedicated signal path is provided between the EP 428 and the history stack logic 414 to indicate the occurrence of any passive error.

The "other" block 430 is representative of any other logic segment in which data may originate for collection in the history stack logic 414, or in which a triggering signal may be issued to control start and stop events. For example, logic maintaining the date and time of day may be provided, and start and stop events could be triggered at a predetermined date/time, such as midnight on Dec. 31, 1999.

The logic modules and event triggering modules described in connection with the SC 404 in FIG. 4 are provided for purposes of explanation. The controllable operational write modes and controllable start and stop events described below are described in connection with the example provided in FIG. 4. As previously indicated, different logic modules to provide history information and different event triggering modules may be utilized in accordance with the present invention.

The history stack logic 414 operates in one of at least two modes of operation, including a read mode and a write mode. In write mode, the history stack collects data from one or more sections of the chip, ASIC, PCB board or other item to be monitored. In one embodiment of the invention, the data collected includes address, function and control signal information. The information collected is entered into a storage area within the history stack logic 414. In one embodiment, the storage area is a random access memory (RAM). The read mode is used to read out the data collected in the RAM.

In one embodiment of the invention, the history stack has five write modes of operation, including Normal, Cycle, Function/Address, Duplicate Tag, and Normal/Duplicate Tag. The write mode register controls the write mode in which the history stack will operate. The write mode register is dynamically controllable and may be modified while the system clocks are operating normally. Other modes of operation may also be added, and similarly one or more of the write modes identified above may be eliminated in situations where one or more of the write modes is not necessary in a particular application. The invention includes the use of multiple write modes of operation to collect information, and the particular write modes of operation described herein set forth one embodiment of such a multi-mode operation. Therefore, as will be appreciated by those skilled in the art from the description provided herein, the particular write modes of operation described are for illustrative purposes, and the present invention is not limited thereto.

FIG. 5 is a table 500 illustrating one embodiment of the invention having five write modes of operation. The current mode under which the history stack is operating is defined by predefined identifiers. In one embodiment, a 3-bit register is used to identify the particular mode of operation. Three register bits will provide for up to eight different modes of operation, and the number of bits used is dependent on the number of write modes employed. It should be recognized that the particular write mode register bit patterns implemented is not relevant to the invention, and other bit patterns may be used to identify the particular write modes of operation. Therefore, the particular bit patterns identified in FIG. 5 are for illustrative purposes only.

In the embodiment of FIG. 5, the write mode column 502 identifies five different write modes of operation. The write mode register bits in column 504 illustrate the particular register bits selected to identify each of the various write modes. The register may be any size desired, depending on the number of write modes in the application. For example, the register may be a 3-bit, 8-bit, 16-bit, 32-bit or other size register, or any number of bits within such a register may be designated as the write mode register bits. In the example of FIG. 5, three bits in the register bit column 504 are used to designate five different write modes shown in write mode column 502. Three register bits may be used to designate a number of modes ranging from five to eight, four register bits to designate nine to sixteen modes, and so forth. The register bits may be consecutive or non-consecutive bits in the register, or alternatively the bits may be distributed among multiple registers. However, in one embodiment of the invention, the register bits are consecutive bits in a single 3-bit [0:2] register. The following descriptions illustrate the use of multiple write modes, and in particular, five predefined write modes of operation.

The "normal" mode, shown at row 506, is designated by setting the register bits to values [1 X X]. The register bits 504 indicate the "normal" write mode 506 when the register bits [0:2] equal [1 X X], where X represents any value. Therefore, when bit-0 of the 3-bit register is a binary 1, the write mode is in the "normal" write mode. The "normal" mode is defined to direct the history stack to capture information, including address, function and control signal information, each time a request is received from a first predetermined logic section. In one embodiment, this predetermined logic section is the Input Logic (IL) section described in connection with FIG. 4, and the data collected in this mode includes data from the IL 420, the CL 418 and the BC 424 and CB 426 sections of the bus interface logic 422.

The "cycle" mode, shown at row 508, is designated by setting the register bits 504 to [0 1 1]. The "cycle" mode is defined to direct the history stack to capture information, including address, function and control signal information, every predetermined clock cycle, if the data has changed. In one embodiment, the data collected in this mode includes data from the IL 420, the CL 418 and the BC 424 and CB 426 sections of the bus interface logic 422. Further, the cycle mode captures the information on every predetermined clock cycle which in one embodiment is every "minor clock cycle". In some instances the system clock may be AND'ed with multiple phase enable signals, such as a phase 1 enable and a phase 2 enable offset by 180 degrees in phase. In this instance, the result is a phase 1 clock signal and a phase 2 clock signal where the duty cycles are not 50%. A "minor clock cycle" is defined as the occurrence of one phase 1 clock pulse from the phase 1 clock signal followed by one phase 2 clock pulse from the phase 2 clock signal. While this minor clock cycle is used as the predetermined clock cycle in this particular embodiment of the invention, the cycle mode of the present invention is equally applicable to use with other predetermined clock cycles.

The "function/address" mode, shown at row 510, is designated by setting the register bits 504 to [0 0 0]. The "function/address" mode is defined to direct the history stack to capture information, including address, function and control signal information, each time a request from a predetermined logic section is received and the current function and address match the predetermined function and address values. In one embodiment of the invention, the predetermined logic section is the Input Logic (IL) section previously described, and the data collected in this mode includes data from the IL 420, the CL 418 and the BC 424 and CB 426 sections of the bus interface logic 422. The predetermined function and address values may be stored in corresponding function and address compare registers for comparison to the current function and address. If the values in the function and address compare registers match the current function and address, and a request is received from the IL, the information capture will be initiated. In one embodiment of the invention, the compare function is performed using function and address mask registers, which allows a single address or an address range to be specified, or a subset of the possible functions, to initiate the data collection. This mode is particularly useful for debugging when a snapshot of various system information is desired when a particular address has been, or will be, accessed.

The "duplicate tag" mode, shown at row 512, is designated by setting the register bits 504 to [0 0 1]. The "duplicate tag" mode is defined to direct the history stack to capture information, including address, function and control signal information, each time a trigger from the duplicate tag logic is received. As previously indicated, each duplicate tag (e.g., 410, 412 of FIG. 4) will perform a search to determine if the data block is resident (i.e., a "hit") within the first level cache of the associated instruction processor. If a hit occurs, that IP's tag must be invalidated. Where no hit occurs, no action is required. Triggering on the occurrence of a trigger from the duplicate tag logic 410, 412 allows data from the IL 420, CL 418 and the CB 426 section of the bus interface logic 422 to be captured, as well as data associated with the duplicate tag logic 410, 412 itself. For example, when in duplicate tag mode, instruction cache invalidate functions, operand cache invalidate functions, and the invalidate address are among the data of interest. In this manner, history stack information collection can be triggered on data invalidate events, and provides for debugging and troubleshooting cache coherency problems.

The "normal or duplicate tag" mode, shown at row 514, is designated by setting the register bits 504 to [0 1 0]. The "normal or duplicate tag" mode is defined to direct the history stack to capture information, including address, function and control signal information, each time a request is received from the IL section or each time a trigger from the duplicate tag logic is received. In one embodiment of the normal/duplicate tag mode, the data collected includes data from the IL 420, CL 418 and the CB 426 section of the bus interface logic 422, as well as data associated with the duplicate tag logic 410, 412 itself.

As described above, the particular write modes are useful in one particular embodiment of the invention; however different, additional or a reduced number of write modes may alternatively be used in accordance with the present invention.

The history stack includes features that control the data capture, including starting and stopping the write mode operations. The start features enable initiation of the collection of information when certain events occur within designated portions of the system, such as certain sections of the hardware. The stop features halt the collection of the data when the designated event occurs. When used in connection with the various write modes of operation, this provides extensive controllability of what data will be collected, and when such collection begins and ends.

In one embodiment of the invention, the history stack has three write mode start events, including Always On, Start on Function/Address Compare, and Start on IP Signal. The start events initiate the collection of data when the designated event occurs. A multi-bit register is used to allow dynamic control of the start event, and may be modified while the system clocks are operating normally. Different, additional or a reduced number of start events than those described below may be used in accordance with the invention, as the particular start events described herein set forth one embodiment of such a multi-mode start feature. Therefore, as will be appreciated by those skilled in the art from the description provided herein, the particular start events described are for illustrative purposes, and the present invention is not limited thereto.

FIG. 6 is a table 600 illustrating one embodiment of the invention having three defined start events. The start event under which the history stack is operating is defined by predefined identifiers. In one embodiment, a 5-bit start/stop event register is used to identify both the start and stop events, wherein two bits of the 5-bit register are dedicated to the start features. Two register bits will provide for up to four different start events, and the number of bits used is dependent on the number of start events desired. It should be recognized that the particular start/stop event register bit patterns which are implemented is not particularly relevant to the invention, and other bit patterns may be used to identify the particular start (and stop) events. Therefore, the particular bit patterns identified in FIG. 6 are for illustrative purposes only.

In the embodiment of FIG. 6, the start feature column 602 identifies three different start events and one reserved or "undefined" start event. The start event register bits in column 604 illustrate the particular register bits selected to identify each of the various start events. The register may be any size desired, depending on the number of start events desired for the particular application. For example, the register may be any size register, or any number of bits within a larger register may be designated as the start event register bits. In the example of FIG. 6, two bits in the register bit column 604 are used to designate three different defined start events shown in start feature column 602. Two register bits may be used to designate a number of start events ranging from two to four, three register bits to designate five to eight start events, and so forth. The register bits may be consecutive or non-consecutive bits in the register, or alternatively the bits may be distributed among multiple registers. However, in one embodiment of the invention, the register bits are consecutive bits in a single 5-bit register, where bits [0:1] represent the two bits corresponding to the start events. The following descriptions illustrate the use of multiple start events, and in particular, three predefined start events.

The "always on" start event, shown at row 606, is designated by setting the most significant register bits [0:1] to values [0 0] as shown in column 604 corresponding to the "always on" start event. The "always on" start event is defined to direct the history stack to write data to the history stack RAM based solely on the particular write mode that the history stack is operating under. For instance, when the write mode is "normal," data will be captured for the first request received from the IL section, and for each subsequent request received from the IL section. Therefore, data capturing is continuously enabled while the start event is "always on," and the particular write mode defines what data is captured.

The "start on F/A compare" start event, shown at row 608, is designated by setting the most significant register bits [0:1] to values [0 1] as shown in column 604 corresponding to the "start on F/A compare" start event. The "start on F/A compare" start event is defined to direct the history stack to initiate writing data to the history stack RAM when the current function and address (from a predetermined logic section such as the IL section) match predefined function and address values. The predefined function and address values may be stored in corresponding function and address compare registers for comparison to the current function and address. If the values in the function and address compare registers match the current function and address, data collection will begin. In one embodiment of the invention, the compare function is performed using function and address mask registers, which allows a single address or an address range to be specified, or a subset of the possible functions, to initiate the data collection.

The "start on IP signal" start event, shown at row 610, is designated by setting the most significant register bits [0:1] to values [1 0] as shown in column 604 corresponding to the "start on IP signal" start event. The IP signal represents an interface signal from an instruction processor (IP), and the IP may be programmed to provide this signal upon the occurrence of predefined events. The "start on IP signal" start event is defined to direct the history stack to initiate writing data to the history stack RAM when a predefined logical signal (e.g., logical 0) is received on the interface signal from the instruction processor. More particularly, the IP has the ability to send this "indication" to start capturing information and to stop capturing it. Microcode within the IP can control this operation. The microcode can detect certain conditions and send out the start signal indication (or as described below, to drop the signal to stop capturing information). This is particularly useful as a special debugging tool where attempting to debug a problem in the instruction processor microcode, so that an information capture can start at a particular point in this sequence of microcode instructions.

At row 612 an "undefined" start event is illustrated. This is reserved for a future start event that may be desired. In the event that its use is desired, it would be designated by setting the most significant register bits [0:1] to values [1 1] as shown in column 604 corresponding to the "undefined" start event.

As described above, the particular start events are useful in one particular embodiment of the invention; however different, additional or a reduced number of start events may alternatively be used in accordance with the present invention.

As previously indicated, the history stack includes a stop feature that controls the termination of the write mode operations. The stop feature includes a plurality of "stop events" that halt the collection of information when certain predefined events occur, regardless of how the data collection was initiated. In one embodiment of the invention, once a stop event has suspended data collection, the start registers must be reloaded in order to restart data collection. Alternatively, the occurrence of a stop event may be configured to automatically reinstate the previous start event or some other predefined start event. For example, in another embodiment of the invention, when the "start on IP signal" start event is active, each time the interface signal from the IP is a predefined value (e.g., logical 0), the history stack will automatically restart the data capture.

FIG. 7 is a table 700 illustrating one embodiment of the invention having eight stop events. The stop event under which the history stack is operating is defined by predefined identifiers. In one embodiment, a 5-bit start/stop event register is used to identify both the start and stop events, wherein three bits of the 5-bit register are dedicated to the stop features. Three register bits will provide for up to eight different stop events, and the number of bits used is dependent on the number of stop events desired. It should be recognized that the particular start/stop event register bit patterns which are implemented is not particularly relevant to the invention, and other bit patterns may be used to identify the particular stop events. Therefore, the particular bit patterns identified in FIG. 7 are for illustrative purposes only.

In the embodiment of FIG. 7, the stop feature column 702 identifies eight different stop events. The stop event register bits in column 704 illustrate the particular register bits selected to identify each of the various stop events. The register may be any size desired, depending on the number of stop events desired for the particular application. For example, the register may be any size register, or any number of bits within a larger register may be designated as the stop event register bits. In the example of FIG. 7, three bits in the register bit column 704 are used to designate eight different stop events shown in stop feature column 702. Three register bits may be used to designate a number of stop events ranging from five to eight, four register bits to designate nine to sixteen stop events, and so forth. The register bits may be consecutive or non-consecutive bits in the register, or alternatively the bits may be distributed among multiple registers. However, in one embodiment of the invention, the register bits are consecutive bits in a single 5-bit register, where bits [2:4] represent the three bits corresponding to the stop events. The following descriptions illustrate the use of multiple stop events, and in particular, eight predefined stop events.

The "no stop" stop event, shown at row 706, is designated by setting register bits [2:4] to values [0 0 0] as shown in column 704 corresponding to the "no stop" stop event. The "no stop" stop event is defined to direct the history stack to continue to write data to the history stack RAM based solely on the write mode under which the history stack is currently operating under. For example, when the write mode is "normal," data will be captured for the first request received from the IL section, and for each subsequent request received from the IL section. Therefore, data capturing is continuously enabled while the stop event is "no stop," and the selected write mode defines what data is captured, and when.

The "stop on F/A compare" stop event, shown at row 708, is designated by setting register bits [2:4] to values [01] as shown in column 704 corresponding to the "stop on F/A compare" stop event. The "stop on F/A compare" stop event is defined to direct the history stack to stop the data collection when the current function and address match predefined function and address values. The predefined function and address values may be stored in corresponding function and address compare registers for comparison to the current function and address. If the values in the function and address compare registers match the current function and address, data collection will terminate. In one embodiment of the invention, the compare function is performed using function and address mask registers, which allows a single address or an address range to be specified, or a subset of the possible functions, to halt the data collection.

The "stop on IP signal" stop event, shown at row 710, is designated by setting register bits [2:4] to values [0 1 0] as shown in column 704 corresponding to the "stop on IP signal" stop event. As previously described, the IP signal represents an interface signal from an instruction processor (IP). The "stop on IP signal" stop event is defined to direct the history stack to stop writing data to the history stack RAM when a predefined logical signal (e.g., logical 1) is received on the interface signal from the instruction processor. Microcode within the IP controls asserting or removing this indication to start and stop capturing information. This is particularly useful as a special debugging tool where attempting to debug a problem in the instruction processor microcode, so that an information capture can stop at a particular point in this sequence of microcode instructions.

The "stop before overwrite" stop event, shown at row 712, is designated by setting register bits [2:4] to values [0 1 1] as shown in column 704 corresponding to the "stop before overwrite" stop event. The "stop before overwrite" stop event is defined to direct the history stack to stop writing data to the history stack RAM when the number of samples collected in the history stack RAM reaches a predetermined number of entries. In one embodiment, the RAM size has a 1 k RAM depth, and when the number of samples reaches 1023 (one sample less than the RAM size), the history stack will stop capturing data.

The "stop on EP detected critical error" stop event, shown at row 714, is designated by setting register bits [2:4] to values [1 0 0] as shown in column 704 corresponding to the "stop on EP detected critical error" stop event. The EP is the error and partitioning logic 428 described in connection with FIG. 4. The "stop on EP detected critical error" stop event is defined to direct the history stack to stop writing data to the history stack RAM when the EP section sends an indication that a critical error occurred. A critical error is user-definable, and may include critical system events that threaten sustained operation of the system and may result in automatic or advised system shut down.

The "stop on EP detected passive error" stop event, shown at row 716, is designated by setting register bits [2:4] to values [1 0 1] as shown in column 704 corresponding to the "stop on EP detected passive error" stop event. The "stop on EP detected passive error" stop event is defined to direct the history stack to stop writing data to the history stack RAM when the EP section sends an indication that a passive error occurred. A passive error is user-definable, and may include non-critical system events that do not immediately threaten sustained operation of the system, but nonetheless indicate that a failure or threatening situation may be imminent, non-critical or redundant components require attention, and the like.

The "stop on no request from IP" stop event, shown at row 718, is designated by setting register bits [2:4] to values [1 1 0] as shown in column 704 corresponding to the "stop on no request from IP" stop event. The "stop on no request from IP" stop event is defined to direct the history stack to stop writing data to the history stack RAM based on a count value. When this stop event is designated, the history stack will begin counting each non-IP request until it either receives an IP request or reaches a predefined count value. In one embodiment of the invention, this predefined count value is 512. If an IP request is received, the count is reset to 0 and counting resumes. If the count reaches 512, the history stack stops capturing data. This particular stop event is particularly useful to detect a failed or "hung" instruction processor. It is expected that requests will occur every so often from the IP, and where no requests have been received for the predefined count value, a hang condition is assumed. By stopping the information capture into the history RAM on this event, the data currently in the history RAM will not be overwritten. The predefined count value is chosen to be less than the number of history RAM locations so that valid history spaces will be in the history RAM upon occurrence of the stop event. For example, where the history RAM is a 1 k RAM (i.e., 1024 locations), and the count value is 512, the first 512 history locations written should remain valid. In other words, because the bus 408 will still be operational and additional requests will continue to arrive, and where the IP has "hung," the remaining history locations that are not overwritten by the newly arrived bus requests will be valid.

The "stop on no request from bus" stop event, shown at row 720, is designated by setting register bits [2:4] to values [1 1 1] as shown in column 704 corresponding to the "stop on no request from bus" stop event. The "stop on no request from bus" stop event is defined to direct the history stack to stop writing data to the history stack RAM based on a count value. When this stop event is designated, the history stack will begin counting each non-bus request until it either receives a bus request or reaches a predefined count value. In one embodiment of the invention, this predefined count value is 512. If a bus request is received, the count is reset to 0 and counting resumes. If the count reaches 512, the history stack stops capturing data. This mode is similar to the "stop on no request from IP" in that it is useful to detect a failed or "hung" bus 408. It is expected that requests will occur every so often from the bus, and where no requests have been received for the predefined count value, a hang condition is assumed. By stopping the information capture into the history RAM on this event, the data currently in the history RAM will not be overwritten. The predefined count value is chosen to be less than the number of history RAM locations so that valid history spaces will be in the history RAM upon occurrence of the stop event. Therefore, because the IP may still be operational and additional requests will continue to arrive, and where the bus has "hung," the remaining history locations that are not overwritten by the newly arrived IP requests will be valid.

The registers defined above may be loaded in any manner known in the art, and in one embodiment they are loaded using scan string technologies. Generally, scan design approaches include an operation whereby certain desired logic patterns are serially inputted and shifted to the appropriate latch locations. Scan methods considers any digital circuit to be a collection of registers or flip-flops interconnected by combinatorial logic where data is then shifted into a large shift register organized from the storage elements of the circuit. A static scan operation is a scan operation where the unit is operated in the "shift mode" (i.e., by withholding the system clock excitations and turning on the shift scan control signals to the unit). This therefore requires stopping the system clock, or performing the scan prior to the time the system clock starts. A dynamic scan operation is a scan operation where scanning may occur even where the system clock is operating, thereby eliminating the need to stop the system clock.

Dynamic scanning is used in one embodiment of the invention to initialize and modify the mode and start/stop registers. Dynamic scanning therefore allows access to the dynamic string while the regular clocks are running and during normal operating mode.

When in write mode, the dynamic string is used, among other things, to initialize or modify the mode and start/stop registers. When in read mode, two separate scan operations are performed using one dynamic string. A first scan operation sets the address of the history stack storage to read, while a second subsequent scan operation reads out the data from that address. This subsequent scan operation can also reinitialize the dynamic string to read the next address. This loop may be performed until the entire history stack storage has been read.

Figure 8:
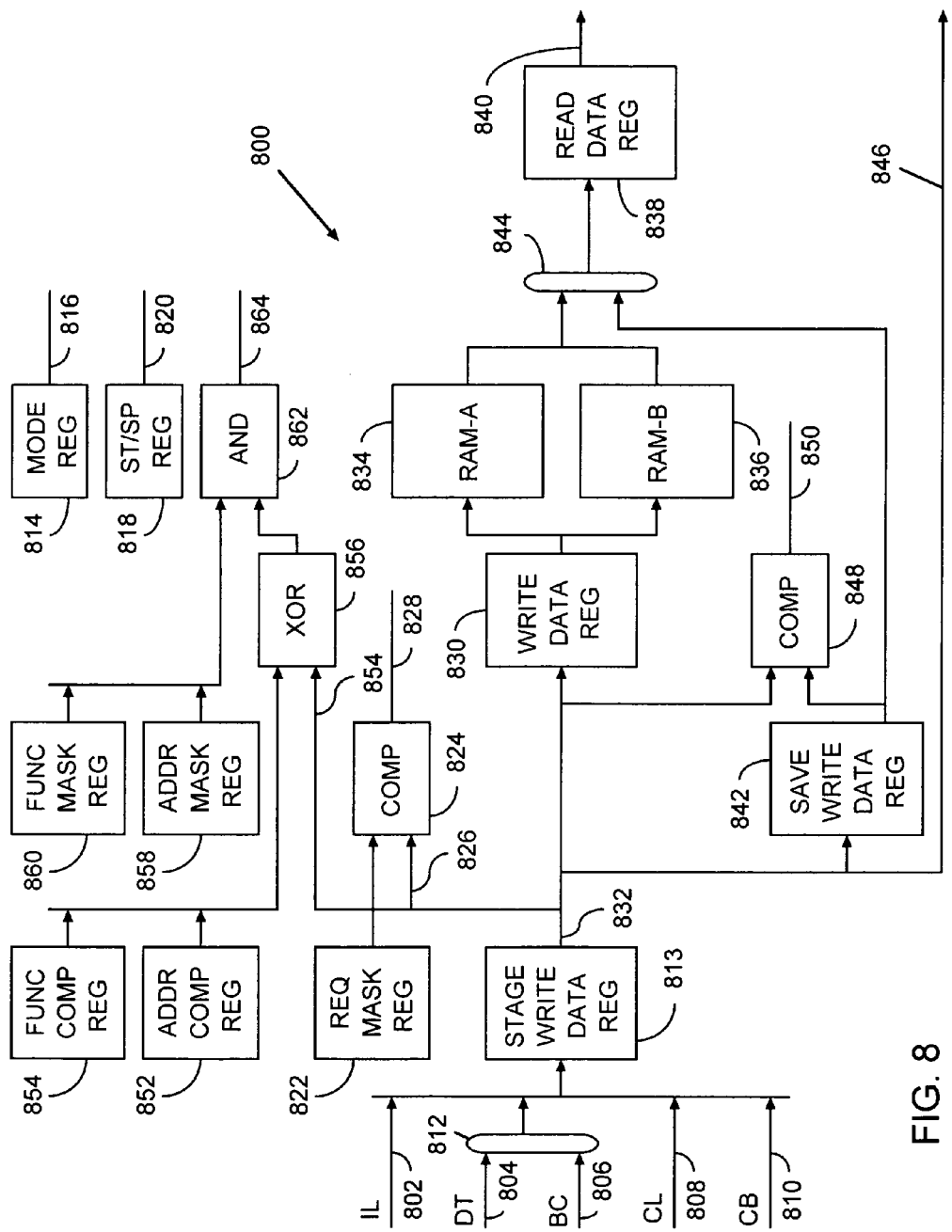
FIG. 8 is a block diagram of one embodiment of the history stack logic in accordance with the present invention.

FIG. 8 is a block diagram of one embodiment of the history stack logic 800 in accordance with the present invention. Predefined inputs to the history stack logic 800 include input logic (IL) data on input 802, duplicate tag (DT)

data on input 804, bus control 1 (BC) data on input 806, control logic (CL) data on input 808, and bus control 2 (CB) data on input 810. Data from each of the IL, DT, BC, CL and CB logic sections thus provide data to the history stack logic 800 to ultimately be stored as history information, depending on the write mode selected. For example, the multiplexer 812 allows either the duplicate tag (DT) or bus control 1 (BC) data to be collected depending on the selected write mode. All of the selected data is entered into the stage write data register 813, and in one embodiment is 225 bits in length.

The particular write mode selected is determined by the contents of mode register 814. The mode register 814 is dynamically configured via a dynamic scan string, and the mode selected is available on at mode register output 816. The particular start and stop features selected is determined by the contents of the start/stop register 818, which is also dynamically configured via the dynamic scan string. The history stack logic 800 determines what the start or stop event is via the start/stop register output 820.

Each logic section in the system capable of making data requests is referred to as a "requester." For example, the input logic (IL) is an interface for the instruction processors and ultimately for the bus. Therefore, the IL is a requester, and has a requester identification associated with it. The IL data on input 802 therefore includes a field for the requester identification. The request mask register 822 stores information to be compared with the requester identification to enable or disallow certain requesters from entering data into the history stack memory. The requester identification(s) are stored along with the other information in the stage write data register 813, and the requester identification(s) are provided to the comparator 824 via path 826. The contents of the request mask register 822 and the requester identification(s) on path 826 are compared by comparator 824. The resulting compare signal on line 828 indicates whether or not the requester will be allowed to enter data into the history stack memory. This is useful to mask off certain requesters to focus on other requesters at a particular time.

The stage write data register 813 receives the data prior from the inputs. The register 813 provides a data staging function before forwarding the data to the write data register 830 via signal path 832. Information from the write data register 830 is then stored into the history stack memory, shown in the example of FIG. 8 as two random access memories, RAM-A 834 and RAM-B 836. In one embodiment, each RAM 834, 836 represents a 113X1K physical RAM, collectively providing a 226-bit wide by 1K deep logical memory. When in read mode, the RAM 834, 836 contents are forwarded to the read data register 838, thereby allowing the data to be dynamically scanned out via path 840.

The save write data register 842 is also coupled to signal path 832 from the stage write data register 813. The save write data register 842 controllably forwards the information from the stage write data register 813 to the read data register 838 via the multiplexer 844. Therefore, using the multiplexer 844 when in write mode, the information can be captured in the RAMs 834, 836 and concurrently in the read data register 838. This allows for dynamic scanning of a "snapshot" of the current state of the input data in the SC. Selected subsets (or the entire set) of information on signal path 832 is also optionally provided on pinout path 846. On the pinout path 846, a pin output debug multiplexer (not shown) may be used to controllably provide a subset of the entire set of information to accessible pins. This information is routed to the instruction processor which also has a pin output debug multiplexer to allow certain internal signals to be made available. In one embodiment, 44 real time signals between the IP and the history stack logic can be made available at chip pins, which can then be captured and analyzed with a logic analyzer.

The information from the stage write data register 813 is made available to the comparator 848. The information from the save write data register 842, clocked on a subsequent clock phase, it also provided to the comparator 848. For the cycle mode, the history stack is allowed to capture information only if the data has changed. The comparison made by comparator 848 determines whether the information has changed, since it compares the current information to the information occurring at the previous clock cycle. Where the comparison indicates that the data has changed, and the system is in write mode, an enable signal is provided as seen on path 850. This enable signal is used to allow, or disallow, information to be stored in the RAMs 834, 836, depending on the comparison result. The enable signal can be provided to an enable input on the write data register 830, or alternatively can be provided to an enable input on the RAMs 834, 836. In either case, where the enable signal is asserted on path 850 and the history stack logic 800 is in cycle mode, the information will be permitted to be stored in the RAMs 834, 836. A cycle mask register (not shown) may also be provided to enable certain bits that are of interest, while disabling other bits.

An address may be scanned into the address compare register 852 via dynamic scanning or other means. Similarly, a function value may be loaded into the function compare register 854. The address and function loaded into the address compare register 852 and function compare register 854 is used in "function/address" mode, where the history stack captures information each time a request is received from a predetermined logic section, and the current function and address match the function and address values in the address compare register 852 and function compare register 854. The address and function values respectively stored in the address compare register 852 and the function compare register 854 are compared to the current address and function input to the history stack logic 800. In one embodiment, this comparison is performed by routing the address and function signals from the signal path 832 to address and function signal path 854, and ultimately to a compare module 856. In one embodiment, the compare module 856 is an exclusive-OR (XOR) module. The values stored in the address and function compare registers 852, 854 are also provided to the XOR 856 for comparison. If the XOR 856 determines that the current address bits and/or function bits match the address bits and/or function bits in the address and function compare registers 852, 854, it indicates that the current address/function is the target address and/or function. Where a match occurs, the function/address mode will enable the information to be stored in the history stack memory 834, 836.

In another embodiment of the invention, an address mask register 858 and a function mask register 860 are provided. These mask registers allow for a range of addresses or functions to be monitored for, rather than a single address or function. For example, where each bit in the address mask register 858 is AND'ed at AND module 862 with the address portion of the output of the XOR 856, bits that have been masked will not affect the ultimate enable signal provided at the AND output 864. This can be seen more clearly in the following table:

TABLE 1

|  | MSB |  |  |  |  |  |  |  |  |  |  | LSB |
|---|---|---|---|---|---|---|---|---|---|---|---|---|
| XOR OUTPUT | 0 | 0 | 0 | 0 | 0 | 0 | 0 | 0 | 0 | 1 | 0 | 1 |
| MASK OUPTUT | 1 | 1 | 1 | 1 | 1 | 1 | 1 | 1 | 0 | 0 | 0 | 0 |
| AND OUTPUT | 0 | 0 | 0 | 0 | 0 | 0 | 0 | 0 | 0 | 0 | 0 | 0 |

This example uses an abbreviated address length for ease of discussion. As can be seen from Table 1, an XOR 856 output of [0000 0000 0101] from most significant bit (MSB) to least significant bit (LSB) indicates that the current address and the address in the address compare register 852 were not exactly the same. This would generally not provide the information capture enable for the function/address mode. However, by providing mask bits, certain bits can be masked off, allowing any current address falling within a range to enable the information capture. In the current example, the mask output of the address mask register 858 is [1111 1111 0000]. Only a comparison of the first eight most significant bits will affect the output of the AND module 862. In this example, the [0000] least significant bits of the address mask register is AND'ed with the least significant bits [0101] of the XOR 856, resulting in an AND 862 output of [0000] for the least significant bits. This mask register is thus set to ignore the state of the four least significant bits. The resulting AND output 864 is [0000 0000 0000], which in this example indicates that the history stack will be enabled to capture information in function/address mode for any address matching the first eight most significant bits, regardless of the state of the four least significant bits. It should be recognized that the AND output may alternatively be a single binary value collectively indicating whether or not the address or address range is a match.

Figure 9:
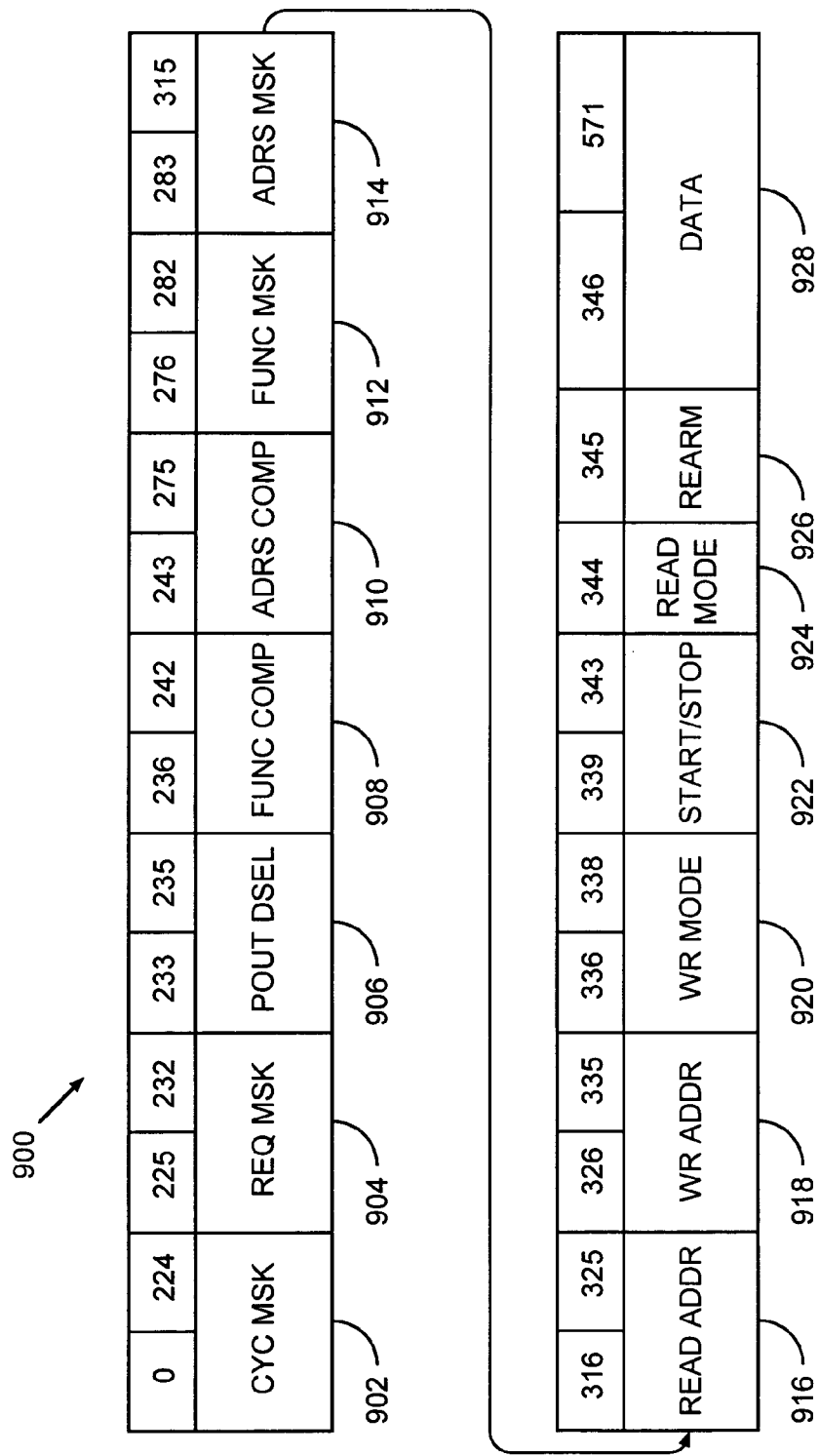
FIG. 9 illustrates one embodiment of a dynamic scan string used to designate the various modes and control functions.

FIG. 9 illustrates one embodiment of a dynamic scan string 900 used to designate the various modes and control functions, including designating the write mode and start and stop events, loading appropriate mask and compare registers, providing the appropriate data, and performing other functions. The particular modes and control functions provided in the dynamic scan string are dependent upon the particular use required, and FIG. 9 illustrates only one particular embodiment of such a dynamic string.

In one embodiment, the dynamic string 900 is 571 bits in length. The dynamic string 900 is serially scanned in, and each designated section is applied to its appropriate hardware register. Each section described below has a certain number of bits associated with it, and the number of bits for each section is illustrated in the embodiment of FIG. 9. For example, the cycle mask (CYC MSK) register 902 is 225 bits in length, ranging from bit-0 to bit-224.

A first subset of the dynamic string contents that can be scanned into the registers of the history stack logic includes the cycle mask (CYC MSK) register 902. The cycle mask register 902 is used in cycle mode to enable or disable particular bits. Information is captured and stored in the memory of the history stack logic only for bits enabled by the cycle mask register 902, and only if the information has changed from its previous state.

The dynamic string contents of the embodiment of FIG. 9 also includes the request mask (REQ MSK) register 904. The request mask register 904 is used in all write modes, and allows selection of which types of requests will have history stack information entered for them. In one embodiment, each bit is unique to a request identification. For example, if bit-0 is set, it enables entries with a request identification of 0, etc. The string 900 also includes the pinout data selector (POUT DSEL) register 906. This register may be used in all modes, and allows selection of a number of bits of history information (i.e., a subset of all history information bits) to be routed to an instruction processor for analysis.

The function compare (FUNC COMP) register 908 is used in function/address (F/A) mode, and is used in conjunction with the function mask (FUNC MSK) register 912. The function compare register 908 and function mask register 912 collectively allow designation of which one or more functions are to be written into the history stack RAMs. Analogously, the address compare (ADRS COMP) register 910 is used in F/A mode in conjunction with the address mask (ADRS MSK) register 914. The address compare register 910 and address mask register 914 collectively allows designation of a range of addresses, so that only requests that use those addresses in the range will permit data to be written into the history stack RAMs.

The state of the read mode (READ MODE) bit 924 controls whether the history stack logic will be in read mode or write mode. When in write mode, information can be captured by the history stack RAMs. When in read mode, the information captured in the history stack RAMs may be scanned out for analysis. Further, when in read mode, no further entries to the history stack RAMs will be made until the read mode bit 924 is changed to again set the history stack logic to write mode.

The read address (READ ADDR) register 916 is used when in read mode, and specifies the address from which the history stack information read will begin. The write address (WR ADDR) register 918 is updated every predetermined clock cycle (e.g., every minor clock cycle) in all write modes, and is a copy of the current write address used to write the history stack RAMs.

The write mode (WR MODE) register 920 is the register that controls under which of the various write modes the history stack will be operating. As previously described, the history stack of one embodiment of the invention includes five write modes of operation, including Normal, Cycle, Function/Address, Duplicate Tag, and Normal/Duplicate Tag.

The start/stop (START/STOP) register 922 controls the starting and stopping of the history stack data capture. As previously described, one embodiment of the invention includes three write mode start events, including Always On, Start on Function/Address Compare, and Start on IP Signal. The start events initiate the collection of data when the designated event occurs, and the start/stop register 922 represents the multi-bit register used to allow dynamic control of the start event.

Asserting the rearm (REARM) bit 926 clears out the history stack "stopped" indicator, thus allowing information capturing to restart after a stop trigger has been received and the data capture has been stopped in order to read the data out of the history stack RAMs.

Finally, the data (DATA) 928 represents the data associated with the particular mode of operation, and is formatted differently for different modes. This is the data that is collected for storage into the history stack RAMs. For example, in normal, cycle and F/A modes, the data 928 which is ultimately stored into the write data register 813 of FIG. 8 includes input logic (IL) data (see FIG. 8; IL 802), the external bus control (BC) address (see FIG. 8; BC 806), the control logic (CL) data (see FIG. 8; CL 808), and the internal bus control (CB) data (see FIG. 8; CB 810). In duplicate tag (DT) and normal/duplicate tag modes, the DT data (see FIG. 8; DT 804) is collected rather than the external BC address. Further, the particular data collected is also formatted to provide certain information regarding the monitored logic section. For example, the input logic (IL) data collected in all write modes may represent certain information from the IL logic section of interest; i.e., information that may assist in debugging problems or what the state of the IL logic section was at a particular time. For example, in one embodiment, the IL data includes information relating to the particular function, address, and data ownership within the IL logic section. When IL data is captured, this allows one to determine what function(s) and address(es) was being processed within the IL, and which cache section owned the data, at a time of interest. The particular data captured from any section is dependent upon the section or module being monitored, and is therefore not specifically pertinent to the invention, and the foregoing description of the precise data collected from a logic section is provided for purposes of explanation only.

Thus, it can be seen that the dynamic string 900 provides a manner of initializing and modifying control parameters and associated data. The dynamic string 900 also provides a manner of reading data stored in the history stack RAMs. While scanning technologies using dynamic strings provide a particularly useful manner of initializing and modifying control parameters and data, other known manners of setting control registers and manipulating data are also applicable and within the scope and spirit of the invention.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for selectively collecting information from a plurality of logical segments in a computing environment, the method comprising:
   controllably designating one of a plurality of information storage modes, wherein each of the information storage modes identifies one or more conditions occurring in the computing environment under which function, address, and control information of a memory access request will be stored;
   controllably designating at least one of a plurality of data collection periods defined by events occurring within designated portions of the computing environment, each of the plurality of data collection periods defining a respective temporal window in which storage of the function, address, and control information is enabled; and
   storing the function, address, and control information identified by the designated information storage mode only during the temporal window corresponding to the designated data collection period, wherein in response to a first mode the function, address, and control information is stored each time a memory request is received, and in response to a second mode the function, address, and control information stored responsive to function and address information in the memory request matching designated function and address information.

2. The method of claim 1, further comprising controllably designating an information retrieval mode, wherein retrieval of the stored information is enabled in response thereto.

3. The method of claim 2, wherein controllably designating an information retrieval mode comprises substituting the designation of the information storage mode with the designation of the information retrieval mode.

4. The method of claim 1, wherein controllably designating at least one of a plurality of data collection periods comprises controllably designating at least one of a plurality of predetermined data collection commencement events, wherein the data collection period commences upon recognition of at least one of the events occurring within the designated portions of the computing environment.

5. The method of claim 1, wherein controllably designating at least one of a plurality of data collection periods comprises controllably designating at least one of a plurality of predetermined data collection termination events, wherein the data collection period terminates upon recognition of at least one of the events occurring within the designated portions of the computing environment.

6. The method of claim 1, further comprising dynamically reconfiguring the data collection periods to designate a different one of the temporal windows in which storage of the designated information is enabled.

7. The method of claim 1:
   wherein controllably designating at least one of a plurality of data collection periods comprises controllably designating at least one data collection commencement event among a plurality of data collection commencement events, wherein the data collection period commences upon recognition of at least one of the events occurring within the designated portions of the computing environment;
   wherein controllably designating at least one of a plurality of data collection periods comprises controllably designating at least one data collection termination event among a plurality of data collection termination events, wherein the data collection period terminates upon recognition of at least one of the events occurring within the designated portions of the computing environment; and
   further comprising reconfiguring the data collection periods by dynamically reconfiguring at least one of the designated data collection events and the designated data termination events.

8. The method of claim 1, further comprising controllably designating at least one of the plurality of data collection periods based on a commencement event independent of the events occurring within designated portions of the computing environment.

9. The method of claim 1, further comprising controllably designating at least one of the plurality of data collection periods based on a termination event independent of the events occurring within designated portions of the computing environment.

10. The method of claim 1, wherein the storing step, in response to a third mode stores the function, address, and control information at predetermined clock cycles, and responsive to a fourth mode and a cache invalidation event stores cache-invalidate function and cache-invalidate address information.

11. The method of claim 1, wherein a first data collection period is initiated in response to the designated mode, a second data collection period is initiated in response to function and address information of the memory request matching designated function and address information, and a third data collection period is initiated in response to a control signal from an instruction processor.

12. The method of claim 11, wherein a data collection period is terminated in response to function and address information in the memory request matching designated function and address information.

13. The method of claim 11, wherein a data collection period is terminated in response to a control signal from an instruction processor.

14. The method of claim 11, wherein a data collection period is terminated in response to storage of function, address, and control information for a designated number of memory requests.

15. The method of claim 11, wherein a data collection period is terminated in response to an error signal.

16. The method of claim 11, wherein a data collection period is terminated in response consecutively receiving a number of memory requests from a requester other than an instruction processor without receiving a memory request from the instruction processor.

17. The method of claim 11, wherein a data collection period is terminated in response to consecutively receiving a number of memory requests from a requester other than a bus without receiving a memory request from the bus.

18. A system for selectively collecting information in a computing environment having a plurality of functional modules, wherein each functional module is associated with time-varying operational information as each functional module operates, and wherein analysis of the operational information may be used to identify operational defects in the computing environment, the system comprising:
 a memory for storing the operational information associated with the functional modules;
 a control interface to provide selectable write mode identifiers, collection initiation identifiers and collection termination identifiers;
 a dynamically-configurable write mode selection module coupled to the control interface to receive one of a plurality of the selectable write mode identifiers, and to enable the storing in the memory of function, address, and control information of a memory access request based on one or more conditions occurring in one or more of the functional modules, in response to the received write mode identifier; and
 a dynamically-configurable timing control module coupled to the control interface to receive one of a plurality of the collection initiation identifiers and one of a plurality of the collection termination identifiers, to enable storing of the function, address, and control information into the memory upon activation of an initiation event occurring within at least one of the functional modules and corresponding to the received collection initiation identifier, and to terminate storing of the function, address, and control information into the memory upon activation of a termination event occurring within at least one of the functional modules and corresponding to the received collection termination identifier, wherein in response to a first write mode identifier the dynamically-configurable timing control module enables storing of the function, address, and control information each time a memory request is received, and in response to a second write mode identifier enables storing of the function, address, and control information responsive to function and address information in the memory request matching designated function and address information.

19. The system as in claim 18, wherein the dynamically-configurable write mode selection module further comprises means for enabling the function, address, and control information to be stored in the memory if the information is received from a predetermined one or more of the functional modules.

20. The system as in claim 18, wherein the dynamically-configurable timing control module comprises a dynamically-scannable register coupled to the control interface to receive and store the collection initiation identifiers and the collection termination identifiers, wherein the dynamically-scannable register includes a plurality of outputs to provide capture enable/disable signals to enable storing of the function, address, and control information into the memory upon activation of an initiation event corresponding to the collection initiation identifier, and to terminate storing of the function, address, and control information into the memory upon activation of a termination event corresponding to the collection termination identifier.

21. The system as in claim 18, further comprising:
 a data interface coupled to receive the operational information from the functional modules; and
 a multiplexing module coupled to the data interface to exclude the operational information external to the function, address, and control information identified by the selectable write mode identifiers.

22. The system as in claim 21, further comprising a write data register coupled to the multiplexing module to receive and store the function, address, and control information.

23. The system as in claim 18, further comprising a dynamically-configurable read mode selection module coupled to the control interface to receive a selectable read mode identifier, and to enable the function, address, and control information stored in the memory to be accessed.

24. A system for selectively collecting information in a computing environment having a plurality of functional modules, wherein each functional module is associated with time-varying operational information as each functional module operates, and wherein analysis of the operational information may be used to identify operational defects in the computing environment, the system comprising:
 a memory for storing the operational information associated with the functional modules;
 a control interface to provide selectable write mode identifiers, collection initiation identifiers and collection termination identifiers;
 a dynamically-configurable write mode selection module coupled to the control interface to receive one of a plurality of the selectable write mode identifiers, and to enable the storing in the memory of function, address, and control information of a memory access request based on one or more conditions occurring in one or more of the functional modules, in response to the received write mode identifier; and
 a dynamically-configurable timing control module coupled to the control interface to receive one of a plurality of the collection initiation identifiers and one of a plurality of the collection termination identifiers, to enable storing of the function, address, and control information into the memory upon activation of an initiation event occurring within at least one of the functional modules and corresponding to the received collection initiation identifier, and to terminate storing of the function, address, and control information into the memory upon activation of a termination event occurring within at least one of the functional modules and corresponding to the received collection termination identifier, wherein the dynamically-configurable write mode selection module comprises a write mode scan register that is loaded via a dynamic scan operation, and wherein in response to a first write mode identifier the dynamically-configurable timing control module enables storing of the function, address, and control information each time a memory request is received, and in response to a second write mode identifier enables storing of the function, address, and control information responsive to function and address information in the memory request matching designated function and address information.

25. A system for selectively collecting information in a computing environment having a plurality of functional modules, wherein each functional module is associated with time-varying operational information as each functional module operates, and wherein analysis of the operational information may be used to identify operational defects in the computing environment, the system comprising:

a memory for storing the operational information associated with the functional modules;

a control interface to provide selectable write mode identifiers, collection initiation identifiers and collection termination identifiers;

a dynamically-configurable write mode selection module coupled to the control interface to receive one of a plurality of the selectable write mode identifiers, and to enable the storing in the memory of function, address, and control information of a memory access request based on one or more conditions occurring in one or more of the functional modules, in response to the received write mode identifier; and a dynamically-configurable timing control module coupled to the control interface to receive one of a plurality of the collection initiation identifiers and one of a plurality of the collection termination identifiers, to enable storing of the function, address, and control information of a memory access request into the memory upon activation of an initiation event occurring within at least one of the functional modules and corresponding to the received collection initiation identifier, and to terminate storing of the function, address, and control information into the memory upon activation of a termination event occurring within at least one of the functional modules and corresponding to the received collection termination identifier, wherein the dynamically-configurable timing control module comprises a timing control scan register that is loaded via a dynamic scan operation, wherein in response to a first write mode identifier the dynamically-configurable timing control module enables storing of the function, address, and control information each time a memory request is received, and in response to a second write mode identifier enables storing of the function, address, and control information responsive to function and address information in the memory request matching designated function and address information.

26. A system for selectively collecting information in a computing environment having a plurality of functional modules, wherein each functional module is associated with time-varying operational information as each functional module operates, and wherein analysis of the operational information may be used to identify operational defects in the computing environment, the system comprising:

a memory for storing the operational information associated with the functional modules;

a control interface to provide selectable write mode identifiers, collection initiation identifiers and collection termination identifiers;

a dynamically-configurable write mode selection module coupled to the control interface to receive one of a plurality of the selectable write mode identifiers, and to enable the storing in the memory of function, address, and control information of a memory access request based on one or more conditions occurring in one or more of the functional modules, in response to the received write mode identifier; and a dynamically-configurable timing control module coupled to the control interface to receive one of a plurality of the collection initiation identifiers and one of a plurality of the collection termination identifiers, to enable storing of the function, address, and control information of a memory access request into the memory upon activation of an initiation event occurring within at least one of the functional modules and corresponding to the received collection initiation identifier, and to terminate storing of the function, address, and control information into the memory upon activation of a termination event occurring within at least one of the functional modules and corresponding to the received collection termination identifier, wherein the dynamically-configurable write mode selection module further comprises means for enabling the function, address, and control information to be stored in the memory if the function, address, and control information changes from a first defined time to a second defined time, in response to a corresponding write mode selection identifier, wherein in response to a first write mode identifier the dynamically-configurable timing control module enables storing of the function, address, and control information each time a memory request is received, and in response to a second write mode identifier enables storing of the function, address, and control information responsive to function and address information in the memory request matching designated function and address information.

27. A system for selectively collecting information in a computing environment having a plurality of functional modules, wherein each functional module is associated with time-varying operational information as each functional module operates, and wherein analysis of the operational information may be used to identify operational defects in the computing environment, the system comprising:

a memory for storing the operational information associated with the functional modules;

a control interface to provide selectable write mode identifiers, collection initiation identifiers and collection termination identifiers;

a dynamically-configurable write mode selection module coupled to the control interface to receive one of a plurality of the selectable write mode identifiers, and to enable the storing in the memory of function, address, and control information of a memory access request based on one or more conditions occurring in one or more of the functional modules, in response to the received write mode identifier; and a dynamically-configurable timing control module coupled to the control interface to receive one of a plurality of the collection initiation identifiers and one of a plurality of the collection termination identifiers, to enable storing of the function, address, and control information of a memory access request into the memory upon activation of an initiation event occurring within at least one of the functional modules and corresponding to the received collection initiation identifier, and to terminate storing of the function, address, and control information into the memory upon activation of a termination event occurring within at least one of the functional modules and corresponding to the received collection termination identifier, wherein in response to a first write mode identifier the dynamically-configurable timing control module enables storing of the function, address, and control information each time a memory request is received, and in response to a second write mode identifier enables storing of the function, address, and control information responsive to function and address information in the memory request matching designated function and address information.

28. A system for selectively collecting information in a computing environment having a plurality of functional modules, wherein each functional module is associated with time-varying operational information as each functional module operates, and wherein analysis of the operational information may be used to identify operational defects in the computing environment, the system comprising:
 a memory for storing the operational information associated with the functional modules;
 a control interface to provide selectable write mode identifiers, selectable read mode identifiers, collection initiation identifiers and collection termination identifiers;
 a dynamically-configurable write mode selection module coupled to the control interface to receive one of a plurality of the selectable write mode identifiers, and to enable selected subsets of the operational information to be stored in the memory in response to the received write mode identifier;
 a dynamically-configurable timing control module coupled to the control interface to receive one of a plurality of the collection initiation identifiers and one of a plurality of the collection termination identifiers, to enable storing of the selected subset of operational information into the memory upon activation of an initiation event corresponding to the received collection initiation identifier, and to terminate storing of the selected subset of operational information into the memory upon activation of a termination event corresponding to the received collection termination identifier;
 a dynamically-configurable read mode selection module coupled to the control interface to receive the selectable read mode identifier, and to enable the selected subset of operational information stored in the memory to be accessed; and
 a dynamically-configurable read data register coupled to the memory to receive and temporarily store the selected subset of operational information in response to the selectable read mode identifier.

29. The system as in claim 28, further comprising:
 a data interface coupled to receive the operational information from the functional modules;
 a multiplexing module coupled to the data interface to exclude the operational information external to the selected subset of operational information identified by the selectable write mode identifiers;
 a write data register coupled to the multiplexing module to receive and store the selected subset of operational information; and
 a second multiplexing module coupled between the memory and the dynamically-configurable read data register to selectively allow the selected subset of information from the write data register or from the memory to be transmitted to the dynamically-configurable read data register.

30. The system as in claim 28, wherein the dynamically-configurable read data register is read via a dynamic scan operation.

31. The system as in claim 28, wherein the dynamically-configurable read mode selection module comprises a read mode scan register that is loaded via a dynamic scan operation.

32. A system for selectively collecting information in a computing environment having a plurality of functional modules, wherein each functional module is associated with time-varying operational information as each functional module operates, and wherein analysis of the operational information may be used to identify operational defects in the computing environment, the system comprising:
 a memory for storing the operational information associated with the functional modules;
 a control interface to provide selectable write mode identifiers, collection initiation identifiers and collection termination identifiers;
 a dynamically-configurable write mode selection module coupled to the control interface to receive one of a plurality of the selectable write mode identifiers, and to enable the storing in the memory of function, address, and control information of a memory request based on one or more conditions occurring in one or more of the functional modules, in response to the received write mode identifier; and
 a dynamically-configurable timing control module coupled to the control interface to receive one of a plurality of the collection initiation identifiers and one of a plurality of the collection termination identifiers, to enable storing of the function, address, and control information into the memory upon activation of an initiation event occurring within at least one of the functional modules and corresponding to the received collection initiation identifier, and to terminate storing of the function, address, and control information into the memory upon activation of a termination event occurring within at least one of the functional modules and corresponding to the received collection termination identifier, wherein the computing environment is an integrated circuit, and wherein at least one of the plurality of functional modules are predetermined logical sections of the integrated circuit, wherein in response to a first write mode identifier the dynamically-configurable timing control module enables storing of the function, address, and control information each time a memory request is received, and in response to a second write mode identifier enables storing of the function, address, and control information responsive to function and address information in the memory request matching designated function and address information.

33. The system as in claim 32, wherein at least one of the plurality of functional modules are external to the integrated circuit.

34. A method for selectively collecting information from a plurality of functional modules in a computing environment, the method comprising:
 selecting an information storage mode from a plurality of available information storage modes, wherein each of the information storage modes identifies one or more conditions occurring in one or more of the functional modules under which function, address, and control information of a memory access request will be stored;

designating one of a plurality of storage commencement events, wherein each of the storage commencement events identifies at least one different triggering event occurring within one or more of the functional modules to enable storage of the function, address, and control information to begin;

designating one of a plurality of storage termination events, wherein each of the storage termination events identifies at least one different triggering event occurring within one or more of the functional modules to discontinue storage of the function, address, and control information;

monitoring for activation of the designated storage commencement event;

enabling storage of the function, address, and control information, as governed by the selected information storage mode, upon recognition of the activation of the designated storage commencement event, wherein in response to a first information storage mode the function, address, and control information is stored each time a memory request is received, and in response to a second information storage mode the function, address, and control information stored responsive to function and address information in the memory request matching designated function and address information;

monitoring for activation of the designated storage termination event; and disabling storage of the function, address, and control information upon recognition of the activation of the designated storage termination event.

35. The method of claim 34, wherein enabling storage of the function, address, and control information comprises storing the function, address, and control information in a memory, and wherein the method further comprises retrieving the information stored in the memory.

36. The method of claim 35, further comprising reconfiguring the designated information storage mode to designate an information retrieval mode, and wherein retrieving the information comprises retrieving the information from the memory in response to the designation of the information retrieval mode.

37. The method of claim 36, wherein reconfiguring the designated information storage mode comprises dynamically scanning a retrieval mode identification into a scan register to designate the information retrieval mode.

38. The method of claim 34, further comprising reconfiguring the designated information storage mode to designate another one of the plurality of information storage modes.

39. The method of claim 34, further comprising reconfiguring the designated storage commencement event to designate another one of the plurality of storage commencement events.

40. The method of claim 39, wherein reconfiguring the designated storage commencement event comprises dynamically scanning a storage commencement identification into a scan register to designate the storage commencement event.

41. The method of claim 34, further comprising reconfiguring the designated storage termination event to designate another one of the plurality of storage termination events.

42. The method of claim 41, wherein reconfiguring the designated storage termination event comprises dynamically scanning a storage termination identification into a scan register to designate the storage termination event.

43. A method for selectively collecting information from a plurality of functional modules in a computing environment, the method comprising:

designating one of a plurality of information storage modes, wherein each of the information storage modes identifies one or more conditions occurring in the computing environment under which function, address, and control information of a memory access request will be stored;

designating one of a plurality of storage commencement events, wherein each of the storage commencement events identifies at least one different triggering event occurring within one or more of the functional modules to enable storage of the function, address, and control information to begin;

designating one of a plurality of storage termination events, wherein each of the storage termination events identifies at least one different triggering event occurring within one or more of the functional modules to discontinue storage of the function, address, and control information;

monitoring for activation of the designated storage commencement event;

enabling storage of the function, address, and control information, as governed by the designated information storage mode, upon recognition of the activation of the designated storage commencement event, wherein in response to a first information storage mode the function, address, and control information is stored each time a memory request is received, and in response to a second information storage mode the function, address, and control information stored responsive to function and address information in the memory request matching designated function and address information;

monitoring for activation of the designated storage termination event;

disabling storage of the function, address, and control information upon recognition of the activation of the designated storage termination event; and reconfiguring the designated information storage mode to designate another one of the plurality of information storage modes, wherein reconfiguring the designated information storage mode comprises dynamically scanning a storage mode identification into a scan register to designate the information storage mode.

* * * * *